(12) United States Patent
Hsu

(10) Patent No.: US 8,926,181 B2
(45) Date of Patent: Jan. 6, 2015

(54) ENDLESS CIRCULATION PATH FOR LINEAR RAIL

(71) Applicant: Chieftek Precision Co., Ltd, Tainan (TW)

(72) Inventor: Ming-che Hsu, Tainan (TW)

(73) Assignee: Chieftek Precision Co., Ltd., Tainan (TW)

( * ) Notice: Subject to any disclaimer, the term of this patent is extended or adjusted under 35 U.S.C. 154(b) by 0 days.

(21) Appl. No.: 13/941,989

(22) Filed: Jul. 15, 2013

(65) Prior Publication Data

US 2014/0161379 A1 Jun. 12, 2014

(30) Foreign Application Priority Data

Dec. 11, 2012 (TW) ............... 101146745 A

(51) Int. Cl.
*F16C 29/06* (2006.01)

(52) U.S. Cl.
CPC ...................... *F16C 29/06* (2013.01)
USPC ............................... 384/44; 384/51

(58) Field of Classification Search
USPC ......... 384/43–45, 49, 51
See application file for complete search history.

(56) References Cited

U.S. PATENT DOCUMENTS

| | | | | |
|---|---|---|---|---|
| 3,210,136 A | * | 10/1965 | Anderson | 384/44 |
| 5,273,365 A | * | 12/1993 | Kondoh | 384/44 |
| 5,988,883 A | | 11/1999 | Takamatu et al. | |
| 5,993,064 A | * | 11/1999 | Teramachi et al. | 384/43 |
| 2007/0147714 A1 | | 6/2007 | Matsumoto et al. | |

* cited by examiner

*Primary Examiner* — Thomas R. Hannon
(74) *Attorney, Agent, or Firm* — Rosenberg, Klein & Lee

(57) ABSTRACT

An endless circulation path for a linear rail includes a loaded path, an unloaded path and two direction change paths which are connected between the loaded path and the unloaded path. Each of the unloaded path, the direction change paths and the loaded path has top and bottom grooves. A first line is connected between top and bottom grooves of the unloaded path. A second line is connected between the top and bottom grooves of each of the direction change paths. A slope of the second line, starting from the intersection between the direction change path and the unloaded path to the intersection between the direction change path and the loaded path, is gradually inclined relative to the first line. A third line is connected between the top and bottom groove of the loaded path. The third line is inclined relative to the first line.

3 Claims, 7 Drawing Sheets

B-B

C-C

D-D

E-E

F-F

ENDLESS CIRCULATION PATH FOR LINEAR RAIL

FIELD OF THE INVENTION

The present invention relates to an endless circulation path for a linear rail, and more particularly, to grooves in the endless circulation path to guide the ball retainer.

BACKGROUND OF THE INVENTION

The conventional linear track rail refers to a solid sliding base endlessly moving along the rail. There is a loaded path formed between the sliding base and the rail, and the sliding base has an unloaded path. Two direction change paths are formed in two ends of the sliding base so as to be connected between the loaded path and the unloaded path. The two direction change paths, the loaded path and the unloaded path form an endless circulation path, and multiple balls are moved along the endless circulation path to achieve the purpose of the movement of the sliding base.

In order to ensure that the balls are moved along the correct path of the endless circulation path and do not hit each other. A ball retainer is used to separate each of the balls. The ball retainer is guided by the top and bottom grooves. U.S. Pat. No. 5,988,883 discloses an endless retainer wherein the groove slopes/portions of the retainer of the loaded path and the unloaded path are parallel such that the two portions of the retainer can smoothly pass through the direction change paths. Besides, the balls of the loaded path have contact faces contacting the rail to support the force between the sliding base and the rail. In order to obtain a larger contact face for each ball, the retainer is parallel to the tangential face of the contact face, or the retainer is inclined by a small angle relative to the tangential face of the contact face to avoid interfere between the retainer and the rail. However, the above-mentioned arrangement generates an angle between the endless circulation path and the horizontal plane, and increases the height of the sliding base.

Furthermore, the linear rail is developed to be smaller than before so that the angle between the endless circulation path and the horizontal plane has to be reduced. U.S. Patent Publication No. 20070147714 discloses that the sliding base has two endless circulation paths on each of two sides thereof and a smaller angle is formed between each endless circulation path and the horizontal plane so as to obtain a smaller sliding base. However, the above-mentioned arrangement makes one end of the retainer to be too close to the rail and the retainer may drop and hit the rail.

The present invention intends to provide an endless circulation path for a linear rail and improves the shortcomings of the conventional endless circulation path.

SUMMARY OF THE INVENTION

The present invention relates to an endless circulation path for a linear rail and comprises a loaded path defined between a rail and a sliding base. Two direction change paths are respectively formed in two ends of the sliding base. An unloaded path is defined in the sliding base. The two direction change paths are connected between the loaded path and the unloaded path to form an enclosed endless circulation path. The unloaded path has a first top groove and a first bottom groove. A first line is connected between the first top groove and the first bottom groove. The direction change paths each have a second top groove and a second bottom groove. A second line is connected between the second top groove and the second bottom groove. A slope of the second line, starting from the intersection between the direction change path and the unloaded path to the intersection between the direction change path and the loaded path, is gradually inclined relative to the first line. The loaded path has a third top groove and a third bottom groove. A third line is connected between the third top groove and the third bottom groove. The third line is inclined relative to the first line.

Preferably, the slope of the third line is the same as the slope of the intersection between the direction change path and the loaded path of the second line.

Preferably, the slope of the first line is the same as the slope of the intersection between the direction change path and the loaded path of the second line.

The endless circulation path is horizontally installed to the sliding base so that the sliding base can be manufactured smaller to meet the requirement of miniaturization of the linear path.

Besides, the angle between the two respective tangential faces on two ends of the contact face between the ball and the rail, and the third line is smaller to avoid the retainer from dropping and hitting the rail.

One aspect of the present invention is that the third groove of the loaded path is smoothly connected to the second groove, so that when the retainer moves in the direction change paths, it is guided by the gradually inclined third grove, the balls smoothly pass the direction change paths and move in the loaded path.

Another aspect of the present invention is that the endless circulation path of the present invention can be installed horizontally and the angle between the retainer in the loaded path and the tangential faces on two ends of the contact face between the retainer and the rail can be smaller to avoid the retainer from dropping and hitting the rail.

Further another aspect of the present invention is that the guide grooves reduces the change of the slope of the retainer so that the retainer bears less stress, so that the retainer moves smoothly and has longer life of use.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
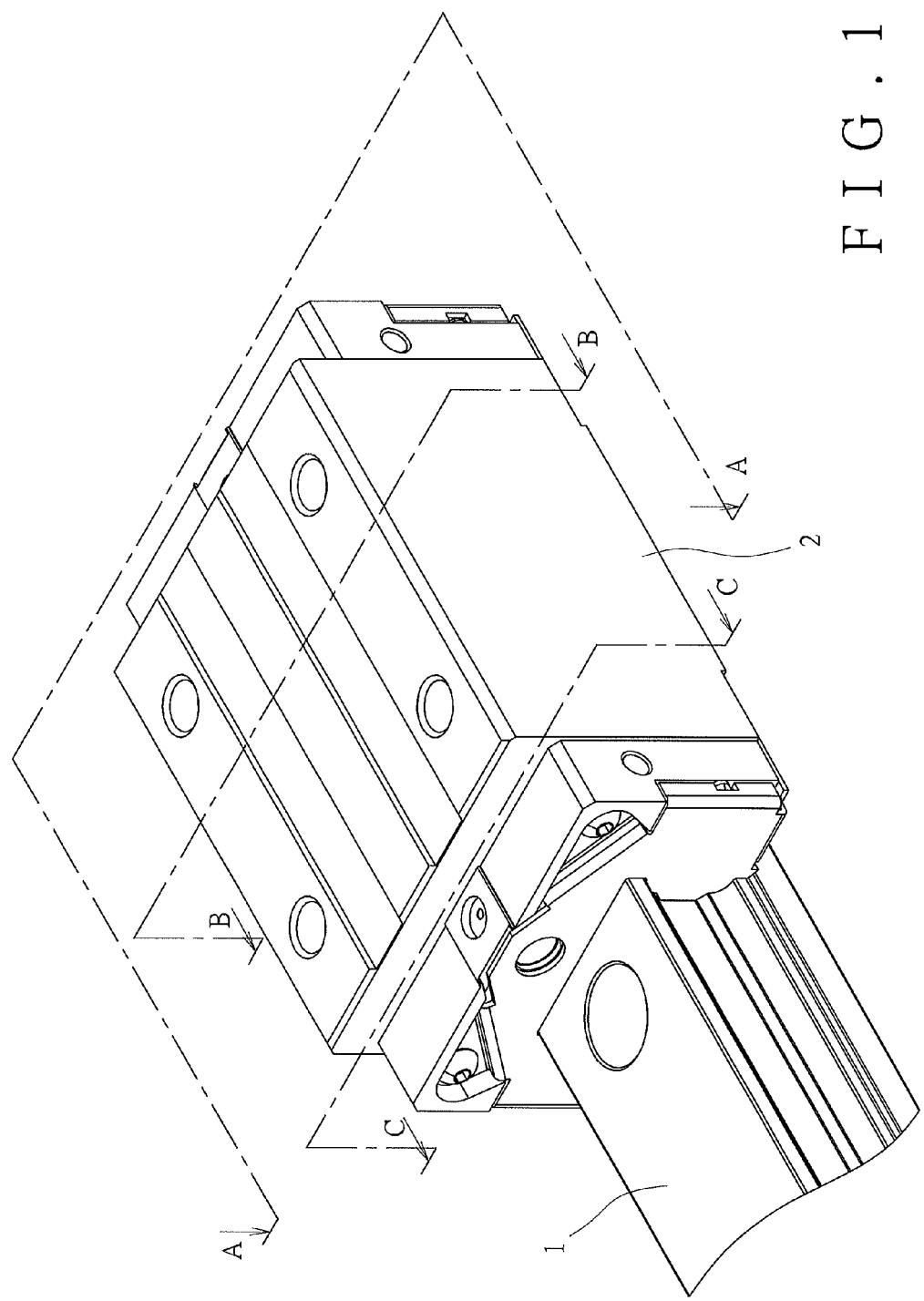
FIG. 1 is a perspective view to show the linear rail of the present invention.
Figure 2:
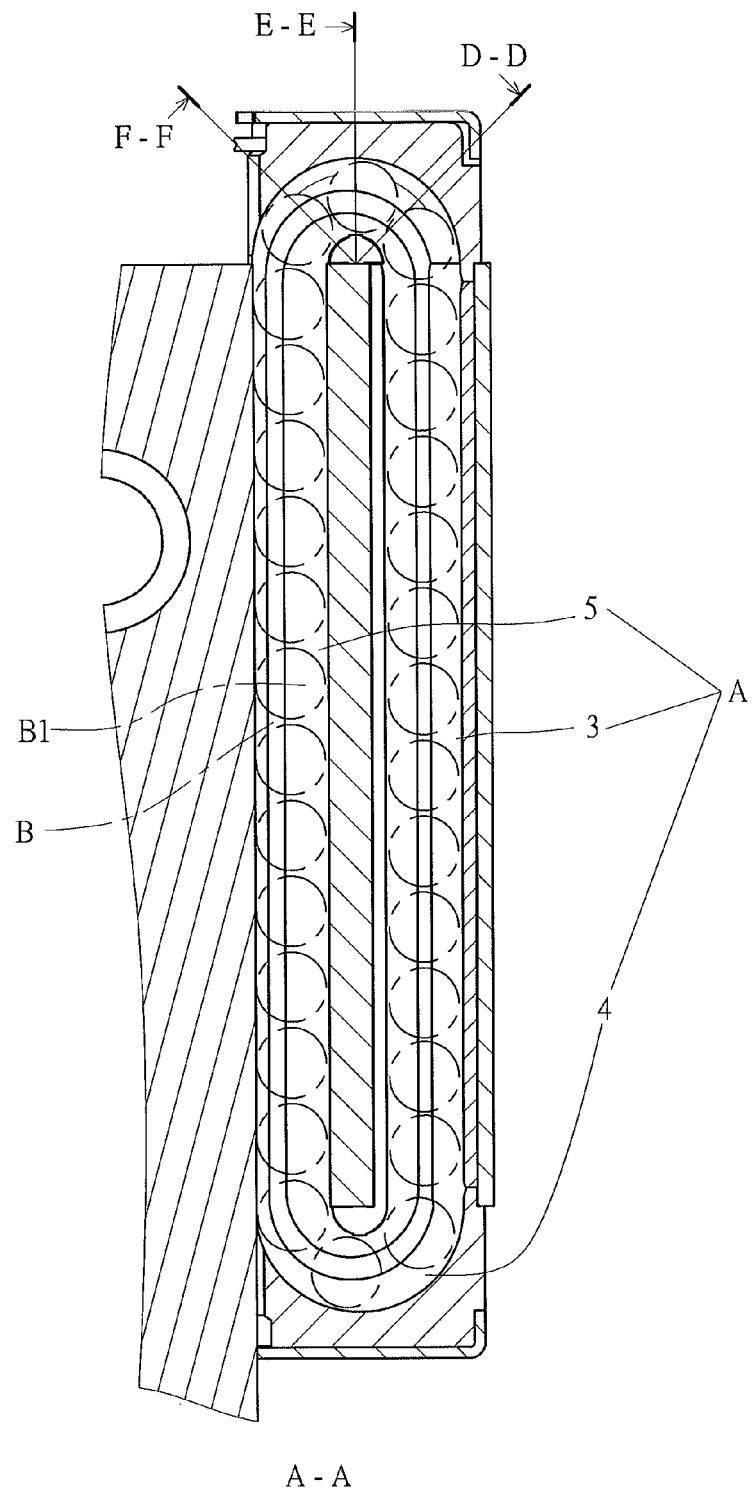
FIG. 2 is a cross sectional view, taken along line A-A of FIG. 1.

Referring to FIGS. 1 and 2, the endless circulation path "A" for a linear rail of the present invention comprises a rail 1 and a sliding base 2 which is movable on the rail 1 and the endless circulation path "A" is defined in the sliding base 2. Two direction change paths 4 are respectively formed in two ends of the sliding base 2. A loaded path 5 is defined between the rail 1 and the sliding base 2, and an unloaded path 3 is defined in the sliding base 2. The two direction change paths 4 are connected between the loaded path 5 and the unloaded path 3 to form the enclosed endless circulation path "A". The endless circulation path "A" has multiple balls "B1" which are retained in a retainer "B" so that the balls "B1" are positioned at their respective positions. Top grooves 31, 41, 51 and bottom grooves 32, 42, 52 are provided in the endless circulation path "A" so as to guide the retainer "B" to smoothly move in the endless circulation path "A" (FIGS. 3-7).

Figure 3:
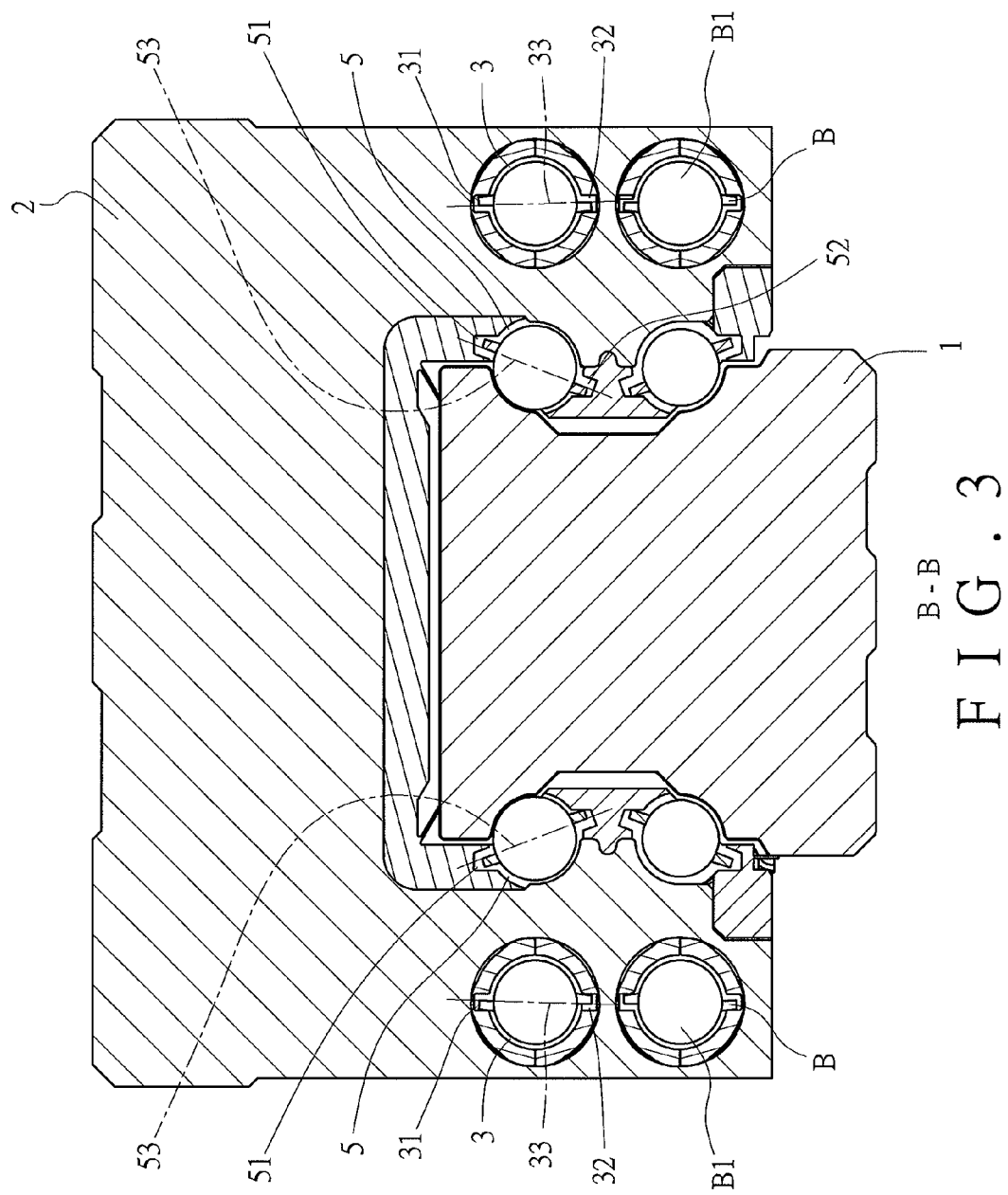
FIG. 3 is a cross sectional view, taken along line B-B of FIG. 1.
Figure 4:
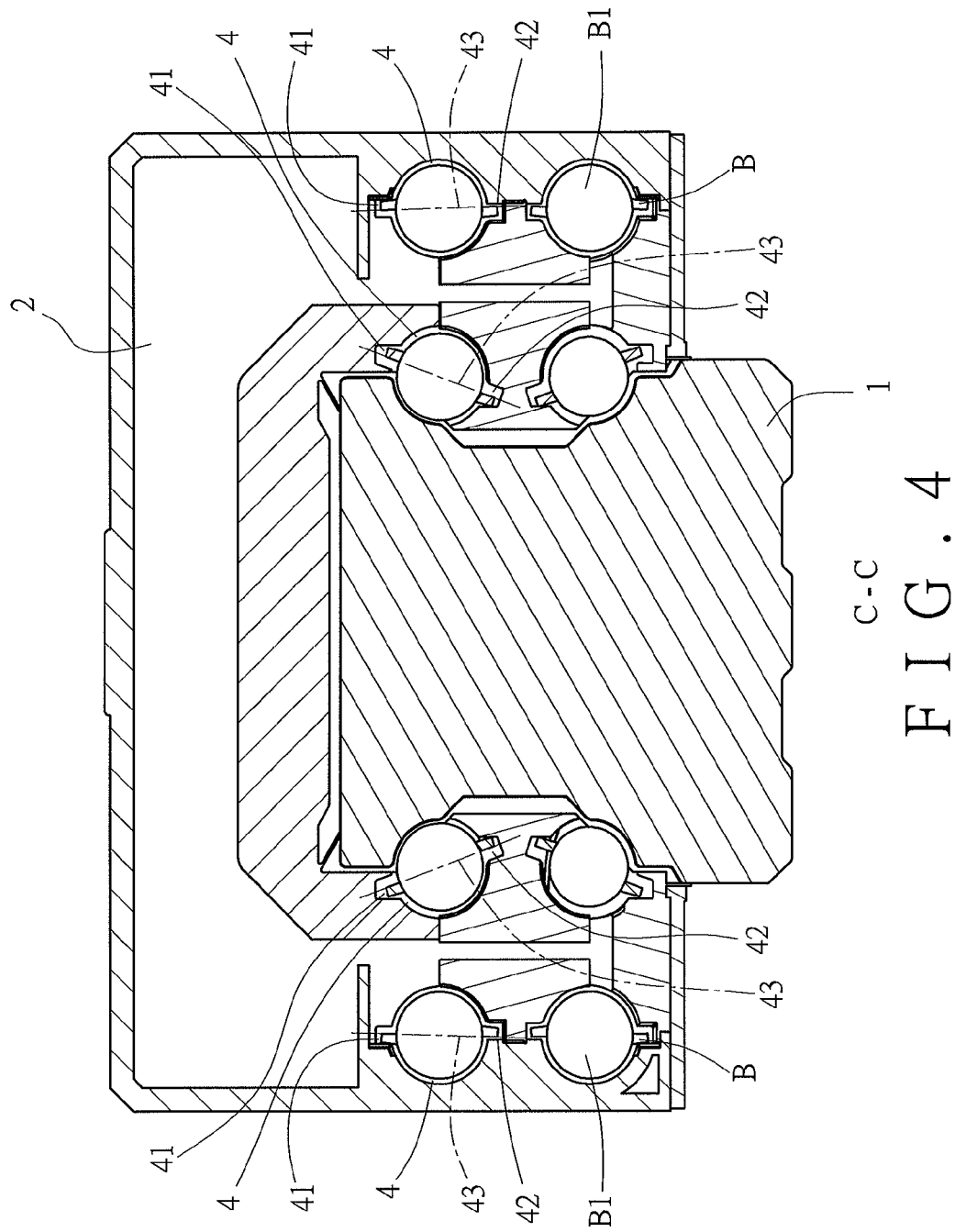
FIG. 4 is a cross sectional view, taken along line C-C of FIG. 1.
Figure 5:
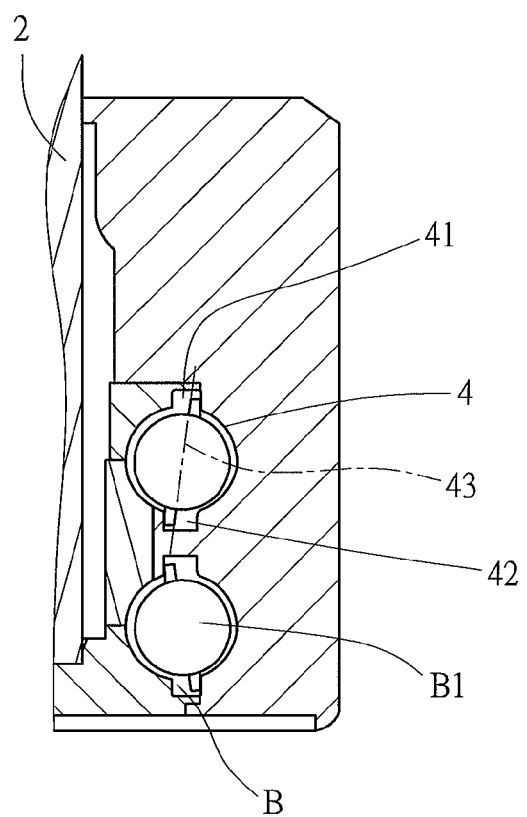
FIG. 5 is a cross sectional view, taken along line D-D of FIG. 2.
Figure 6:
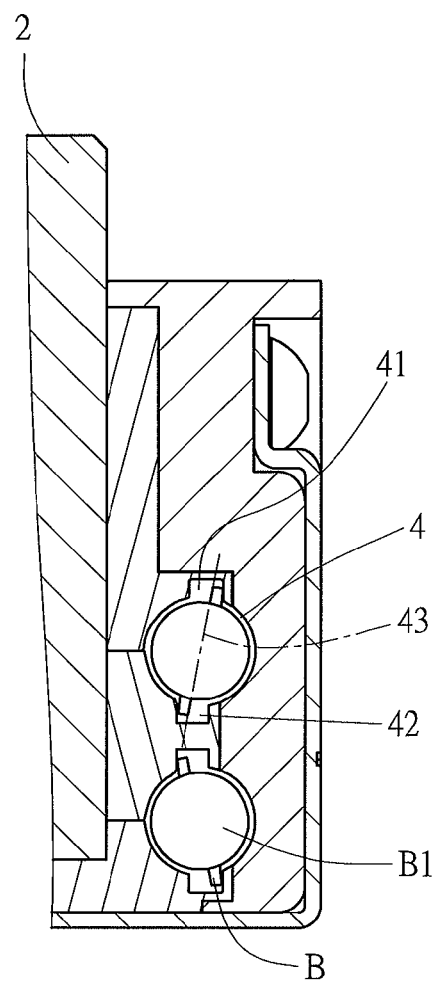
FIG. 6 is a cross sectional view, taken along line E-E of FIG. 2.
Figure 7:
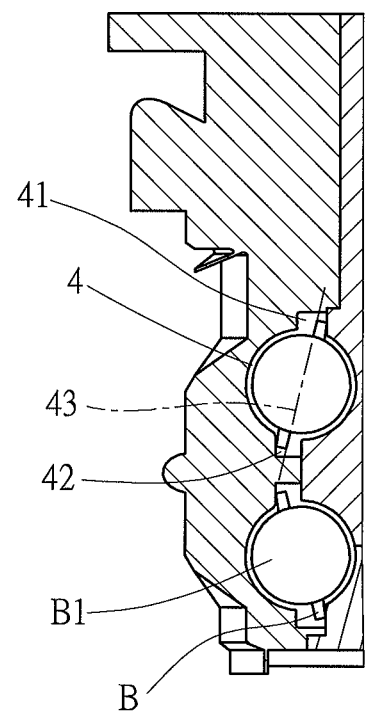
FIG. 7 is a cross sectional view, taken along line F-F of FIG. 2.

As shown in FIG. 3, the unloaded path 3 has a first top groove 31 and a first bottom groove 32. A first line 33 shows a schematic line and is connected between the first top groove 31 and the first bottom groove 32. As shown in FIGS. 4 to 7, the direction change paths 4 each have a second top groove 41 and a second bottom groove 42. A second line 43 shows a schematic line and is connected between the second top groove 41 and the second bottom groove 42. The slope of the second line 43, starting from the intersection between the direction change path 4 and the unloaded path 3 to the intersection between the direction change path 4 and the loaded path 5, is gradually inclined relative to the first line 33. The slope of the first line 33 is the same as the slope of the intersection between the direction change path 4 and the unloaded path 3 of the second line 43. As shown in FIGS. 3 and 4, the loaded path 5 has a third top groove 51 and a third bottom groove 52. A third line 53 shows a schematic line and is connected between the third top groove 51 and the third bottom groove 52. The third line 53 is inclined relative to the first line 33. The slope of the third line 53 is the same as the slope of the intersection between the direction change path 4 and the loaded path 5 of the second line 43. Therefore, the retainer "B" can smoothly enters the direction change path 4 from the unloaded path 3, and enter the loaded path 5 from the direction change path 4 (FIGS. 3-7). As shown in FIG. 3, when the balls "B1" of the retainer "B" move in the unloaded path 3, the retainer "B" is guided by the first top and bottom grooves 31, 32, and the first line 33 is perpendicular to the direction that the sliding base 2 moves.

More specifically, as shown in FIGS. 4-7, when the retainer "B" enters the direction change path 4, the retainer "B" is guided by the second top and bottom grooves 41, 42; because the slope of the second line 43 is gradually inclined, less torsion stress is generated and applied to the retainer "B" when passing through the direction change path 4. Therefore, the balls "B1" retained in the retainer "B" can smoothly pass through the direction change path 4 and enter the loaded path 5. The retainer "B" is guided by the third top and bottom grooves 51, 52 in the loaded path 5, the retainer "B" smoothly moves in the loaded path 5. Furthermore, because the less change of the slope of the retainer "B", the life of use of the retainer "B" is increased.

The endless circulation path "A" of the present invention can be installed horizontally as shown in FIGS. 1-7 so that the sliding base 2 can be made smaller to meet the requirement of miniaturization of the linear path.

While we have shown and described the embodiment in accordance with the present invention, it should be clear to those skilled in the art that further embodiments may be made without departing from the scope of the present invention.

What is claimed is:

1. A linear rail having an endless circulation path between displaceably coupled members thereof, comprising:
   a rail and a sliding base defining the endless circulation path therebetween;
   a plurality of rolling members captured by the rail and sliding base to roll along the endless circulation path during relative displacement between the rail and sliding base;
   a retainer member disposed about the rolling members for retaining relative arrangement thereof, the retainer member advancing with the rolling members along the endless circulation path;
   wherein the endless circulation path includes:
      a loaded path portion defined between the rail and a sliding base, two direction change path portions respectively formed at two ends of the sliding base, an unloaded path portion defined in the sliding base, the two direction change paths connected between the loaded path portion and the unloaded path portion to form an enclosed endless circulation path;
      the unloaded path portion having a first top groove and a first bottom groove slidably engaged by the retainer member, a first reference line being defined between the first top groove and the first bottom groove;
      the direction change path portions each having a second top groove and a second bottom groove slidably engaged by the retainer member, a second reference line being defined between the second top groove and the second bottom groove, a slope of the second reference line along the direction change path portion being progressively inclined relative to the first reference line, and
      the loaded path portion having a third top groove and a third bottom groove slidably engaged by the retainer member, a third reference line being defined between the third top groove and the third bottom groove, the third reference line being inclined relative to the first reference line.

2. The linear rail having an endless circulation path as claimed in claim 1, wherein a slope of the second reference line at a transition between the direction change path portion and the loaded path portion aligns with the slope of the third reference line.

3. The linear rail having an endless circulation path as claimed in claim 1, wherein a slope of the second reference line at a transition between the direction change path portion and the unloaded path portion aligns with the slope of the first reference line.

* * * * *